United States Patent [19]
Temme et al.

[11] 4,422,542
[45] Dec. 27, 1983

[54] SCRAPER-CHAIN CONVEYORS

[75] Inventors: Helmut Temme, Waltrop; Erwin Beckmann, Kamen-Methler, both of Fed. Rep. of Germany

[73] Assignee: Gewerkschaft Eisenhutte Westfalia, Lunen, Fed. Rep. of Germany

[21] Appl. No.: 401,315

[22] Filed: Jul. 23, 1982

Related U.S. Application Data

[63] Continuation of Ser. No. 152,682, May 23, 1980, abandoned.

[30] Foreign Application Priority Data

May 26, 1979 [DE] Fed. Rep. of Germany ....... 2921412

[51] Int. Cl.³ ............................................. B65G 19/28
[52] U.S. Cl. .................................................. 198/735
[58] Field of Search ....................... 198/735, 860, 861

[56] References Cited
U.S. PATENT DOCUMENTS

| | | | |
|---|---|---|---|
| 2,943,728 | 7/1960 | Dommann | 198/861 |
| 3,825,108 | 7/1974 | Stone | 198/860 |
| 4,074,804 | 2/1978 | Crüdken et al. | 198/735 |
| 4,364,470 | 12/1982 | Temme | 198/735 |

*Primary Examiner*—Jeffrey V. Nase
*Assistant Examiner*—Dennis J. Williamson
*Attorney, Agent, or Firm*—Thompson, Birch, Gauthier & Samuels

[57] ABSTRACT

A scraper-chain conveyor has channel-sections or pans arranged end-to-end along which a scraper-chain assembly is circulated. Each pan is composed of rolled side walls with a floor plate welded therebetween. The side walls are reinforced by upper and lower elongate bars welded to their exteriors. These bars have shaped apertures designed to accept and locate the heads and shanks of bolts used to fix attachments to the side walls. The side walls are recessed behind the apertures and these recesses define with the apertures, pockets for receiving the heads of the bolts.

10 Claims, 2 Drawing Figures

SCRAPER-CHAIN CONVEYORS

This application is a continuation of application Ser. No. 152,682, filed May 23, 1980, now abandoned.

BACKGROUND OF THE INVENTION

The present invention relates in general to scraper-chain conveyors as used in mineral, e.g. coal, mining.

It is well known to construct scraper-chain conveyors from a series of channel sections or pans arranged end-to-end and along which a scraper-chain assembly is driven. Each pan is usually fabricated from two shaped side walls between which a floor plate is welded. It is known, for example from German patent specification No. 2531861, to reinforce the side walls with the aid of bars extending the full length of the side walls and welded to the exteriors thereof. The reinforcement bars increase the overall width of the conveyor pan. Attachments, such as spill plates or guides or the like, are secured to one or both side walls of the pan with the aid of bolts held by the side walls. Recesses are provided to locate the heads of these bolts and hitherto, in the case of recesses in the reinforcement bars, it has only been possible to employ bolts with comparatively thin heads.

A general object of the present invention is to provide an improved pan construction for a scraper-chain conveyor.

SUMMARY OF THE INVENTION

A channel or pan for a scraper-chain conveyor and constructed in accordance with the invention is composed of generally sigma-shaped side walls interconnected by a floor plate and reinforced by exterior bars as is known. The bars have apertures therein for receiving the heads and shanks of bolts used to secure attachments to the pan. The side walls themselves have recesses behind the apertures in the bars and these recesses at least partly define pockets for receiving and supporting the heads of the bolts.

Even when the bars are not especially thick, as may be desired where the overall width of the pan is to be minimized, bolts with larger or normal heads can be introduced into the pockets. The profile of the side walls can be unchanged so these components can be in the form of rolled sections used conventionally. Preferably the apertures of the reinforcement bars are relieved or undercut over part of their margins so that the pockets are formed by the side wall recesses and by these relieved portions. The depth of the pockets is thus made up by the sum of the depths of the relieved aperture portions of the bars and the depths of the recesses in the associated side wall of the pan.

The recesses which at least partly define the pockets may be provided in upstanding web portions of the associated side wall which extend between upper and lower flanges and an inwardly-extending inclined V-shaped wall region. The bars can be flush with the upper and lower flanges and the thickness of the reinforcement bars can be not appreciably larger than these web portions of the side walls.

The apertures in the bars can have a wide and a narrow region permitting the head of a bolt to be located through the wide region of one of the apertures and then displaced laterally to bring its shank into the narrower region while the head becomes set into one of the pockets.

The V-shaped regions of the side walls produce V-shaped exterior grooves and individual support blocks or the like can be welded into these grooves. Each such support may have a recess open at one side which also permits the head of a bolt to be located and held behind the support. By locating bolts selectively in the apertures in the upper and/or lower reinforcement bars and/or in the recesses of the supports, attachments can be secured to the conveyor pan most effectively.

A particularly rigid and strong construction can be achieved if the reinforcement bars are welded not only to the side walls of the pan but also to lateral projections of the supports fixed into the V-shaped grooves. The rows of apertures in the upper and lower reinforcement bars and the recesses in the support, which all form bolt receptors, can be vertically aligned in spaced-apart groups.

The invention may be understood more readily, and various other features of the invention may become apparent, from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
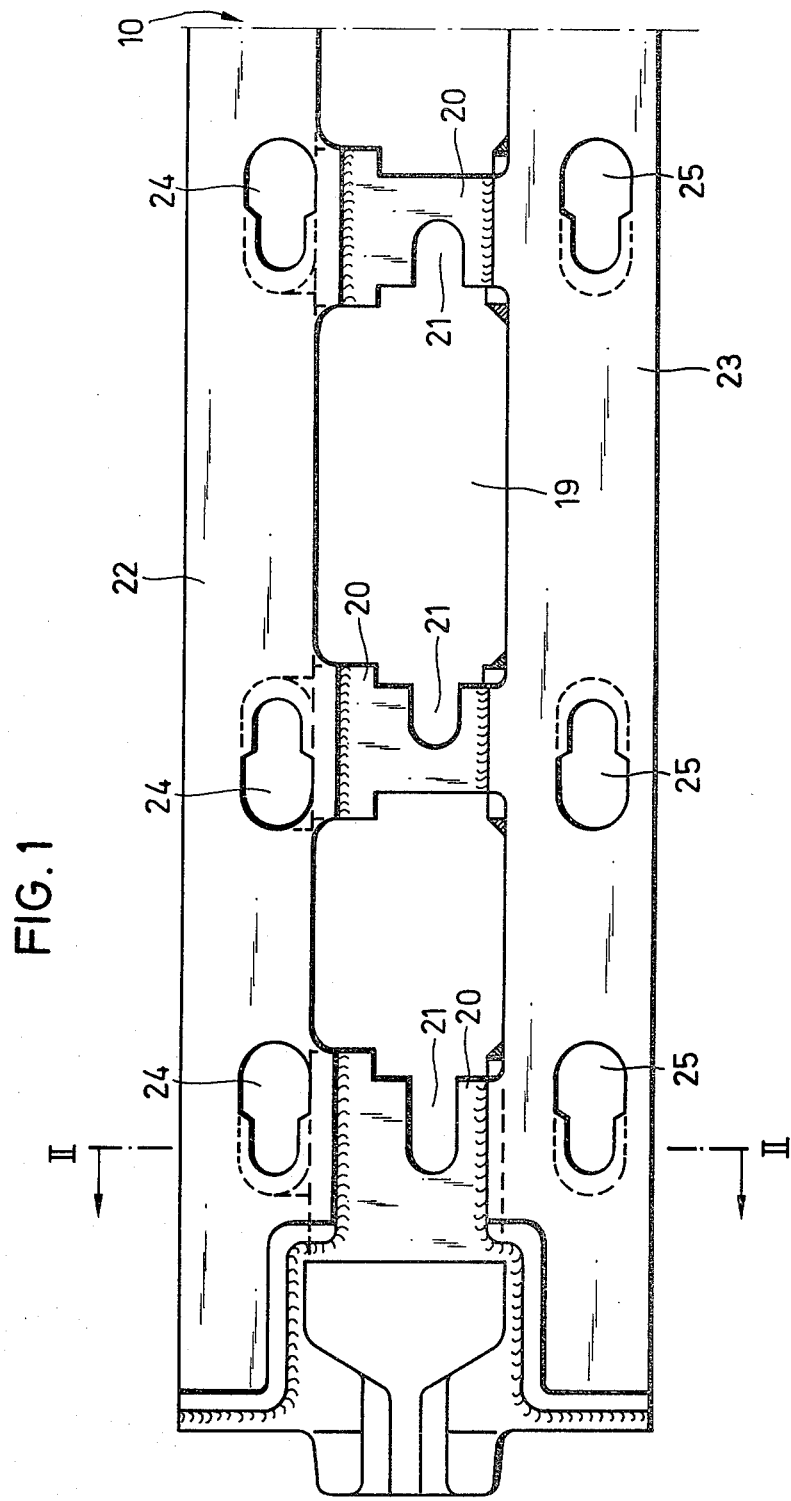
FIG. 1 is a side view of part of a conveyor pan constructed in accordance with the invention.
Figure 2:
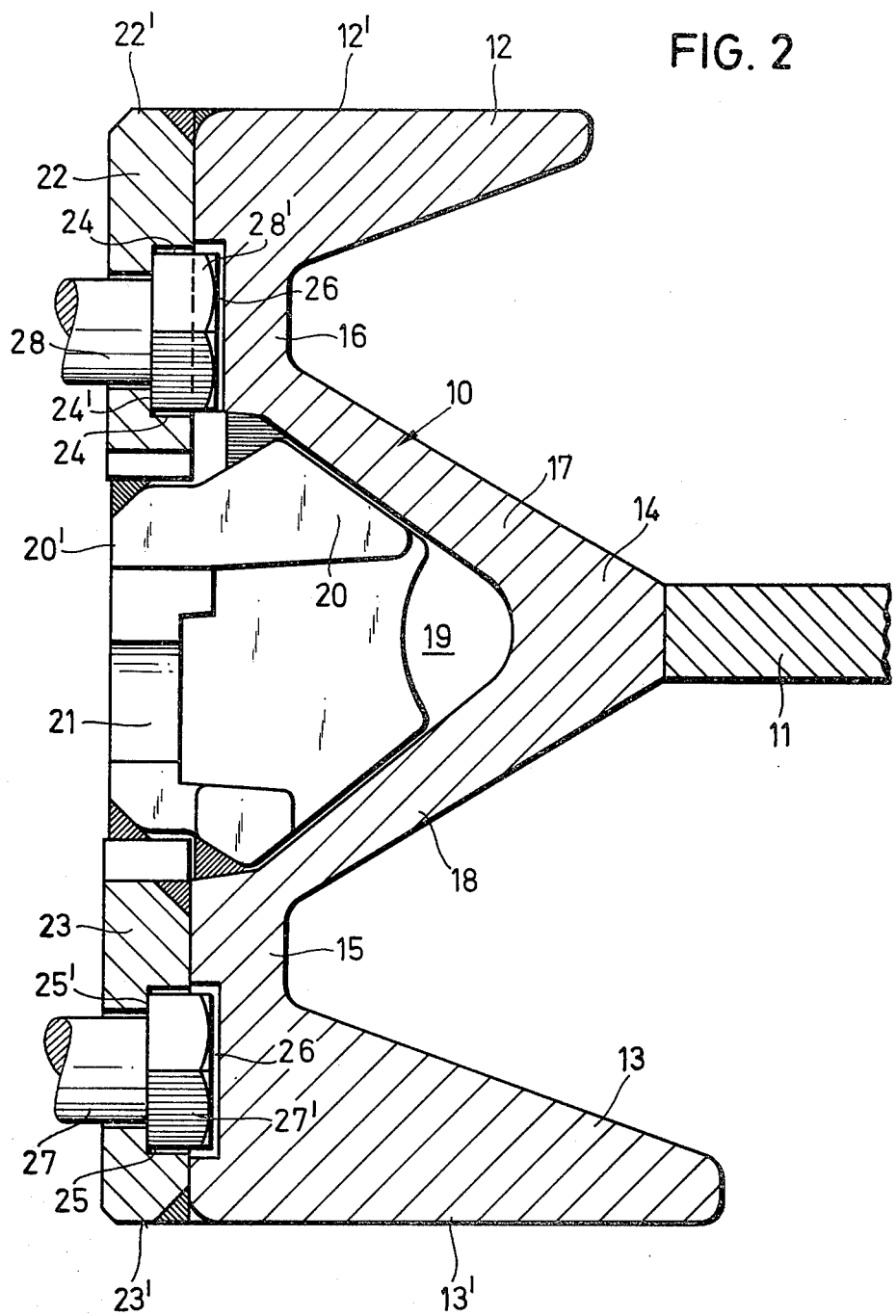
FIG. 2 is a cross-sectional view of part of the conveyor pan shown in FIG. 1, the view being taken along the line II—II of FIG. 1.

As represented in the drawing, a channel section or pan for a scraper-chain conveyor is composed of two sigma-shaped side walls 10 interconnected by means of a floor plate 11 as is well known per se. The side walls 10 are rolled sections. A series of such pans would be arranged end-to-end with a scraper chain assembly (not shown) circulated along the pans to effect the transference of material. Only one of the side walls 10 and part of the floor plate 11 is illustrated in the drawing. As shown in FIG. 2, each side wall 10 has an upper flange 12, a lower flange 13, a central region 14 adjoining the floor plate 11, upstanding web portions 15, 16 adjoining the flanges 12, 13 and inclined side wall portions 17, 18 extending between the web portions 15, 16 and the central region 14. The inclined side wall portions 17, 18 define a V-shaped groove 19 at the outwardly-facing exterior of the side wall 10. The inwardly-facing surfaces of the flanges 12, 13, the web portions 15, 16, the inclined side wall portions 17, 18 and the central region 14 define, with the corresponding surfaces of the opposite side walls 10 and the upper and lower surfaces of the plate 11, upper and lower guide passages along which the scraper-chain assembly moves. The upper run of the scraper-chain assembly moving in the upper guide passage conveys material over the floor plates 11 of the conveyor pans while the lower run of the assembly moving in the lower guide passage forms the return run.

Supports 20 which serve to carry attachments such as spill plates, are welded into the V-shaped grooves 19 and distributed over the length of the conveyor pan. As shown in FIG. 2 the supports 20 project outwardly beyond the associated lateral exterior surface of the side wall 10 of the pan. Each support 20 is provided with a recess 21 open at one side of the support 20 to receive and locate the head and shank of a bolt used to secure the attachment(s) to the pan. As shown in FIG. 2, each recess 21 has an undercut rear portion which forms a pocket for receiving the head of the bolt. This undercut or relieved portion is not wholly essential however since the recess 21 is open at one side to receive the shank of a bolt and its head may locate behind the support in a suitably captive fashion.

Upper and lower reinforcement bars 22, 23 are welded to the exterior of each side wall 10 with their upper faces 22', 23' flush with the upper and lower surfaces 12', 13' of the flange 12, 13 respectively. The bars 22, 23 extend the length of the conveyor pan and are disposed parallel to one another. The lateral thickness of the bars 22, 23 is somewhat smaller than the lateral thickness of the web portions 15, 16 of the side walls 10. Besides being welded to the exterior of the side walls 10, the bars 22, 23 are additionally welded to the outwardly projection portions 20' of the supports 20 as depicted in FIG. 2. The bars 22, 23 are also each provided with shaped e.g. oval, apertures 24, 25 which are aligned centrally of the bars 22, 23 parallel to the longitudinal axis of the side walls 10. The apertures 24, 25 are disposed above and below the recesses 21. Each aperture 24, 25 has a wide and a narrow region. The wide region permits the head 27', 28' of a bolt 27, 28 to be received for location behind the narrow region with its shank extending therethrough as depicted in FIG. 2. The web portions 15, 16 are provided with recesses 26 which together with undercut or relieved margins of the narrow regions of the apertures 24, 25 form pockets receiving the heads 27', 28' of the bolts 27, 28 as depicted in FIG. 2. These pockets have shoulders 24', 25' against which the heads 27', 28' of the bolts 27, 28 become supported.

Attachments of various kinds, such as spill or guard plates or guide rails can be secured to the side walls with bolts (not shown) located with their heads in the pockets behind the supports 20 as described and with bolts 27, 28 located with their heads 27', 28' in the pockets behind the bars 22, 23 as described and illustrated. In general, it is usually sufficient to secure an attachment to one of the side walls 10 of the conveyor pan with just two rows of bolts. If the attachment is loaded or subjected to force from the conveyor then the bolts are best located in the uppermost row of apertures 24 and in the central row of recesses 21. Conversely, if the attachment is loaded or subjected to force from outside the conveyor then it is preferable to locate the bolts in the lowermost row of apertures 25 and in the central row of recesses 21. Where especially heavy loads are to be encountered it is preferable to utilize bolts in all three rows of apertures and recesses 25, 21.

We claim:

1. A conveyor channel section or pan comprising side walls, each with a generally sigma-shaped profile adjoined by a floor plate, each side wall having a central V-shaped groove in its exterior and upper and lower upstanding web portions adjacent said groove, reinforcement bars extending longitudinally of the pans, said bars being welded alongside the exteriors of the web portions of at least one of the side walls, apertures in the bars from which extend the shanks of bolts used to secure attachments to the pan, the inner faces of said bars having relieved portions along the margins of said apertures, and recesses in the exterior faces of the web portions of said at least one side wall behind the apertures, said recesses cooperating with said relieved portions to jointly define pockets in which the heads of said bolts are removably retained.

2. A conveyor pan according to claim 1, wherein supports are welded into the V-shaped groove of said at least one side wall, the supports having recesses at one side for receiving the shanks of further bolts used to secure attachments to the pan.

3. A conveyor pan according to claim 2, wherein the bars are also welded to outwardly projecting portions of the supports.

4. A conveyor pan according to claim 1, wherein the apertures are oval with axes extending parallel to the longitudinal axis of the pan.

5. A conveyor pan according to claim 1, wherein each aperture has a wide and a narrow region whereby the head of a bolt can be located through the wide region and the head displaced laterally to bring its shank into the narrow region while the head becomes set into the associated pocket.

6. A conveyor pan according to claim 1, wherein the apertures are relieved at the rear over part of their margins to partly define the pockets.

7. A conveyor pan according to claim 1, wherein the pockets are defined partly by the recesses and partly by undercut rear portions of the margins of the apertures.

8. A conveyor pan according to claim 1, wherein the thickness of the bars is commensurate with that of the web portions of said at least one side wall.

9. A conveyor pan according to claim 1, wherein the reinforcement bars are flush with upper and lower flanges of said at least one side wall.

10. A conveyor pan according to claim 2, wherein the apertures in the bars and the recesses in the supports on said at least one side wall produce three rows of bolt receptors and these receptors are aligned vertically in spaced-apart groups.

* * * * *